US011079584B2

(12) United States Patent
Shen et al.

(10) Patent No.: US 11,079,584 B2
(45) Date of Patent: Aug. 3, 2021

(54) METHOD FOR USE IN OPTICAL IMAGING, A SYSTEM FOR USING IN OPTICAL IMAGING AND AN OPTICAL SYSTEM

(71) Applicant: City University of Hong Kong, Kowloon (HK)

(72) Inventors: Yajing Shen, Kowloon (HK); Haojian Lu, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 5 days.

(21) Appl. No.: 15/332,201

(22) Filed: Oct. 24, 2016

(65) Prior Publication Data
US 2018/0113296 A1    Apr. 26, 2018

(51) Int. Cl.
*G02B 21/32*    (2006.01)
*G02B 21/26*    (2006.01)
*G06T 7/73*    (2017.01)
*G06T 7/13*    (2017.01)
*G06T 7/246*    (2017.01)

(52) U.S. Cl.
CPC .......... *G02B 21/32* (2013.01); *G02B 21/26* (2013.01); *G06T 7/13* (2017.01); *G06T 7/246* (2017.01); *G06T 7/73* (2017.01); *G06T 2207/10056* (2013.01)

(58) Field of Classification Search
CPC .............. G02B 21/32; G02B 21/26; G06T 2207/10056
See application file for complete search history.

(56) References Cited

U.S. PATENT DOCUMENTS

| | | | | |
|---|---|---|---|---|
| 2011/0169936 | A1* | 7/2011 | Naiki | G02B 21/26 348/79 |
| 2014/0267671 | A1* | 9/2014 | Kenny | G02B 21/26 348/79 |
| 2015/0153560 | A1* | 6/2015 | Lippert | G02B 21/367 348/79 |
| 2017/0205614 | A1* | 7/2017 | Nakano | G02B 7/28 |

\* cited by examiner

*Primary Examiner* — Tat C Chio
(74) *Attorney, Agent, or Firm* — Renner Kenner Greive Bobak Taylor & Weber

(57) ABSTRACT

A method for use in optical imaging, a system for using in optical imaging, and an optical system includes a controller arranged to determine an intermediate position of a sample upon a detection of a completion of a first movement of the sample, and to derive an optimal position associated with the intermediate position; a manipulator arranged to move the sample from the intermediate position to the optimal position with a second movement; wherein the sample is arranged to be observed using an optical instrument in the optimal position.

26 Claims, 15 Drawing Sheets

METHOD FOR USE IN OPTICAL IMAGING, A SYSTEM FOR USING IN OPTICAL IMAGING AND AN OPTICAL SYSTEM

TECHNICAL FIELD

The present invention relates to a method for use in optical imaging, a system for using in optical imaging, and an optical system, and particularly, although not exclusively, to a method for use in optical imaging, a system for using in optical imaging, and an optical system arranged to observe the sample in the optimal position at every rotated angle.

BACKGROUND

Microscopy is the typical means for viewing tiny objects exceeding the resolution range of human eyes. There are many types of microscopes but to name a few, the most common ones are optical microscope, electron microscope, and scanning probe microscope. Microscopes may be classed on the type of interaction with the sample to generate the image, or whether the sample is analysed via a scanning point or at all once.

In recent years, observing tiny samples with high magnification has been one of the most active area of research by the scholars. It can be utilized in different fields of research such as biology observation, material characterization observation, high precision assembly and so on. For instance, observe the zebrafish embryonic development, detect the defects on magnetic properties of glass-coated microwires, and assemble tiny objects with high precision and other related fields.

SUMMARY OF THE INVENTION

In accordance with a first aspect of the present invention, there is provided a method for use in optical imaging, comprising the steps of: determining an intermediate position of a sample upon a detection of a completion of a first movement of the sample; deriving an optimal position associated with the intermediate position, wherein the sample is arranged to be observed using an optical instrument in the optimal position; and moving the sample from the intermediate position to the optimal position with a second movement.

In an embodiment of the first aspect, the optimal position is within the field of view and the depth of field of the optical instrument.

In an embodiment of the first aspect, the intermediate position is beyond the field of view and/or the depth of field of the optical instrument.

In an embodiment of the first aspect, the second movement is manipulated by a micromanipulation mechanism.

In an embodiment of the first aspect, the micromanipulation mechanism comprises a control mechanism for compensating the error of the first movement by the second movement.

In an embodiment of the first aspect, the error of the first movement is associated with the offset of the intermediate position from the optimal position.

In an embodiment of the first aspect, the step of determining the intermediate position of the sample further comprises the step of obtaining the initial position and the intermediate position of the sample by an imaging device.

In an embodiment of the first aspect, the step of determining the intermediate position of the sample further comprises the step of detecting the first movement of the sample from the initial position to the intermediate position obtained by the imaging device through image processing.

In an embodiment of the first aspect, the image processing includes determining the positions of the sample with an edge detector.

In an embodiment of the first aspect, the optimal position of the sample is determined from the three dimensional arrangement of the sample.

In an embodiment of the first aspect, the sample is positioned at an initial position prior of the first movement, with the initial position being arranged to be within the field of view and the depth of field of the optical instrument.

In an embodiment of the first aspect, the sample is rotated at an angle about a rotation axis during the first movement.

In an embodiment of the first aspect, the first movement includes a rotational movement.

In an embodiment of the first aspect, the second movement includes at least one translational movement.

In an embodiment of the first aspect, the first and second movements are within the same plane or two parallel planes.

In an embodiment of the first aspect, the sample is observed under the optical instrument at every rotated angle about the rotation axis.

In an embodiment of the first aspect, the method is repeated to observe the sample in a plurality of optimal positions with respect to a plurality of rotational angles based on the initial position.

In an embodiment of the first aspect, further comprising the step of capturing the sample in the optimal position by the imaging device upon the completion of the second movement.

In an embodiment of the first aspect, the method is repeated to rotate the sample for a complete revolution.

In an embodiment of the first aspect, the optical instrument is a microscope.

In accordance with a second aspect of the present invention, there is provided a system for using in optical imaging, comprising: a controller arranged to determine an intermediate position of a sample upon a detection of a completion of a first movement of the sample, and to derive an optimal position associated with the intermediate position; a manipulator arranged to move the sample from the intermediate position to the optimal position with a second movement; wherein the sample is arranged to be observed using an optical instrument in the optimal position.

In an embodiment of the second aspect, the optimal position is within the field of view and the depth of field of the optical instrument.

In an embodiment of the second aspect, the intermediate position is beyond the field of view and/or the depth of field of the optical instrument.

In an embodiment of the second aspect, the manipulator is arranged to move the sample by manipulating the second movement with a micromanipulation mechanism.

In an embodiment of the second aspect, the micromanipulation mechanism comprises a control mechanism for compensating the error of the first movement by the second movement.

In an embodiment of the second aspect, the first movement includes a rotational movement.

In an embodiment of the second aspect, the second movement includes at least one translational movement.

In an embodiment of the second aspect, the controller is arranged to determine the intermediate position of the sample by obtaining the initial position and the intermediate position of the sample with an imaging device.

In an embodiment of the second aspect, the controller is arranged to determine the intermediate position of the sample by detecting the first movement of the sample from the initial position to the intermediate position obtained by the imaging device through image processing.

In accordance with a third aspect of the present invention, there is provided an optical system, comprising: a sample holding stage arranged to move the sample from an initial position to an intermediate position with a first movement, and to move the sample from the intermediate position to an optimal position with a second movement; a controller arranged to determine the intermediate position upon a completion of the first movement, and to derive the optimal position associated with the intermediate position; an optical instrument arranged to observe the sample positioned in the initial position and/or the optimal position.

In an embodiment of the third aspect, the optical instrument is further arranged to observe the sample in a plurality of optimal positions with respect to a plurality of rotational angles based on the initial position.

In an embodiment of the third aspect, the sample holding stage is further arranged to rotate the sample with a complete revolution.

In an embodiment of the third aspect, further comprising an optical imager arranged to capture an image of the sample in the initial position, the intermediate position and/or the optimal position.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that although today's microscopes are able to view samples with high magnification, most existing microscopy systems can only view samples from one fixed direction, which leads to the limitation during experiments and may cause the research less reliable. While observing the defects or characterization of the micro samples, such as microwires, pollen tubes and so on, the results will be restricted due to the limitation visible surface.

Observing sample from one fixed direction cannot meet the high demands of reflecting the whole properties of the sample. In the research field, observing sample from multi-direction is significant and has very broad applications. To solve or reduce at least some of the above problems, the inventor has devised a method for use in optical imaging, a system for using in optical imaging and an optical system, thereby allowing the sample to be observed from multi-direction.

Figure 1:
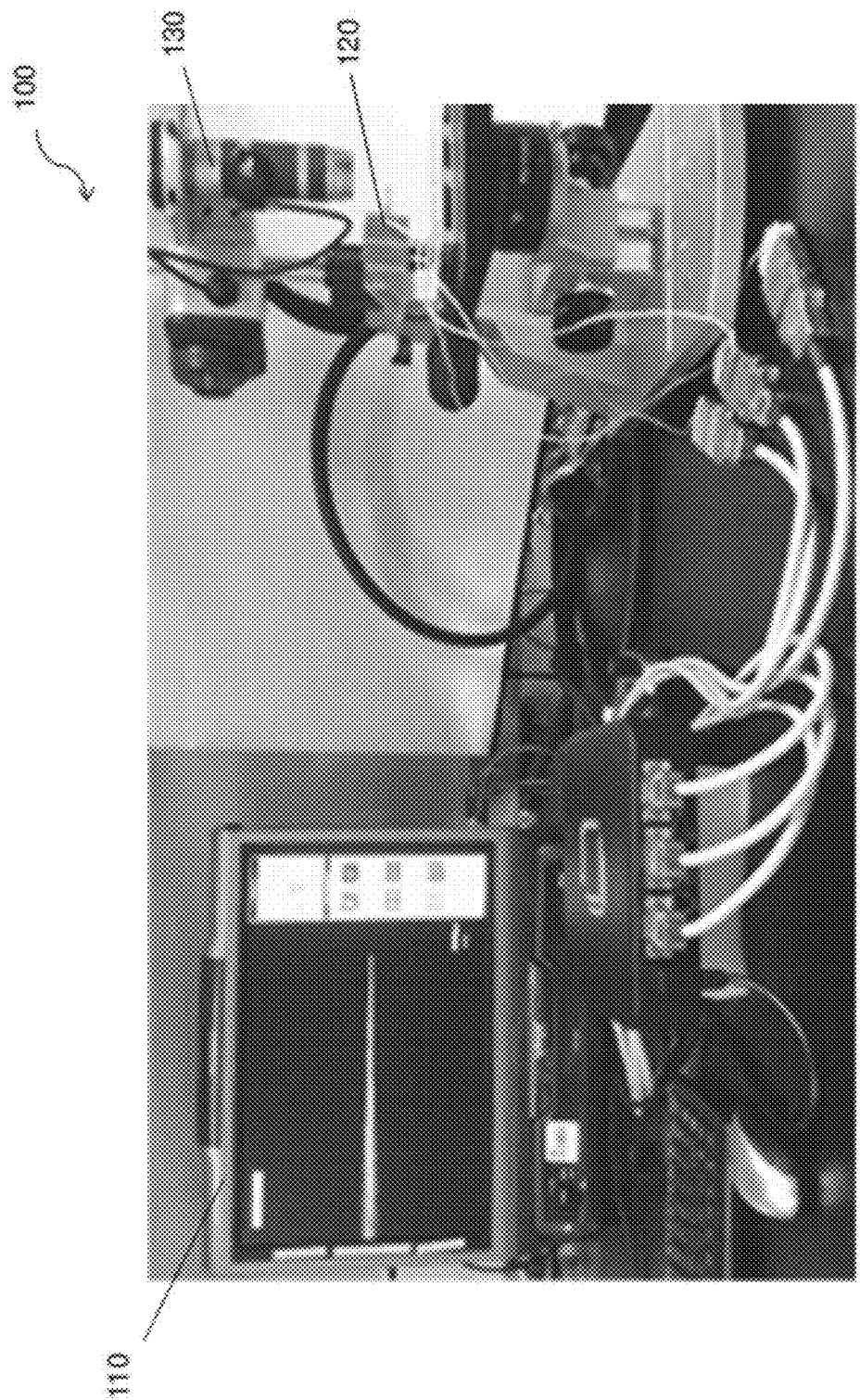
FIG. 1 is a perspective view of a system in accordance with one embodiment of the present invention.

With reference to FIG. 1, there is provided an example embodiment of a system 100 for using in optical imaging, comprising: a controller 110 arranged to determine an intermediate position P of a sample 200 upon a detection of a completion of a first movement of the sample 200, and to derive an optimal position P' associated with the intermediate position P; a manipulator 120 arranged to move the sample 200 from the intermediate position P to the optimal position P' with a second movement; wherein the sample 200 is arranged to be observed using an optical instrument 130 in the optimal position P'.

In one example embodiment, to observe a sample 200 under microscopy, it may be preferably to position the sample 200 at the optimal position P' within the field of view and the depth of field of the optical instrument 130 such as microscope 130. However, the sample 200 arranged for multi-direction observation may be located at an intermediate position P beyond the field of view and/or the depth of field of the optical instrument 130 due to non-ideal movement of the sample. At such intermediate position P, the sample 200 may be out of focus and the user may need to readjust the magnification of the microscope 130 from time to time at after every rotation.

Preferably, the system 100 may comprise three main components including a controller 110, a manipulator 120 and a sample 200 for multi-direction observation.

Figure 2:
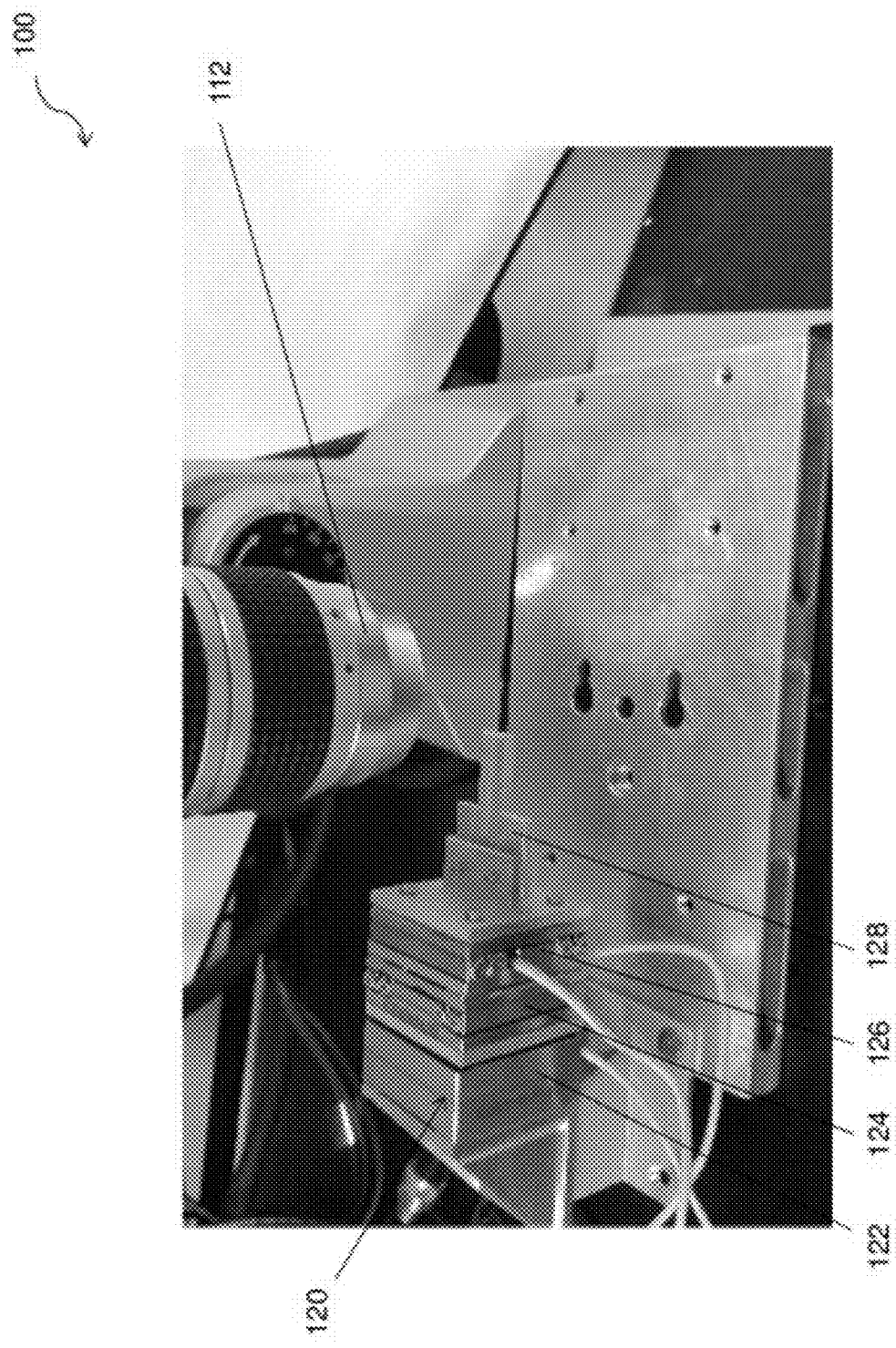
FIG. 2 is an illustration showing the manipulator of system in FIG. 1.
Figure 3:
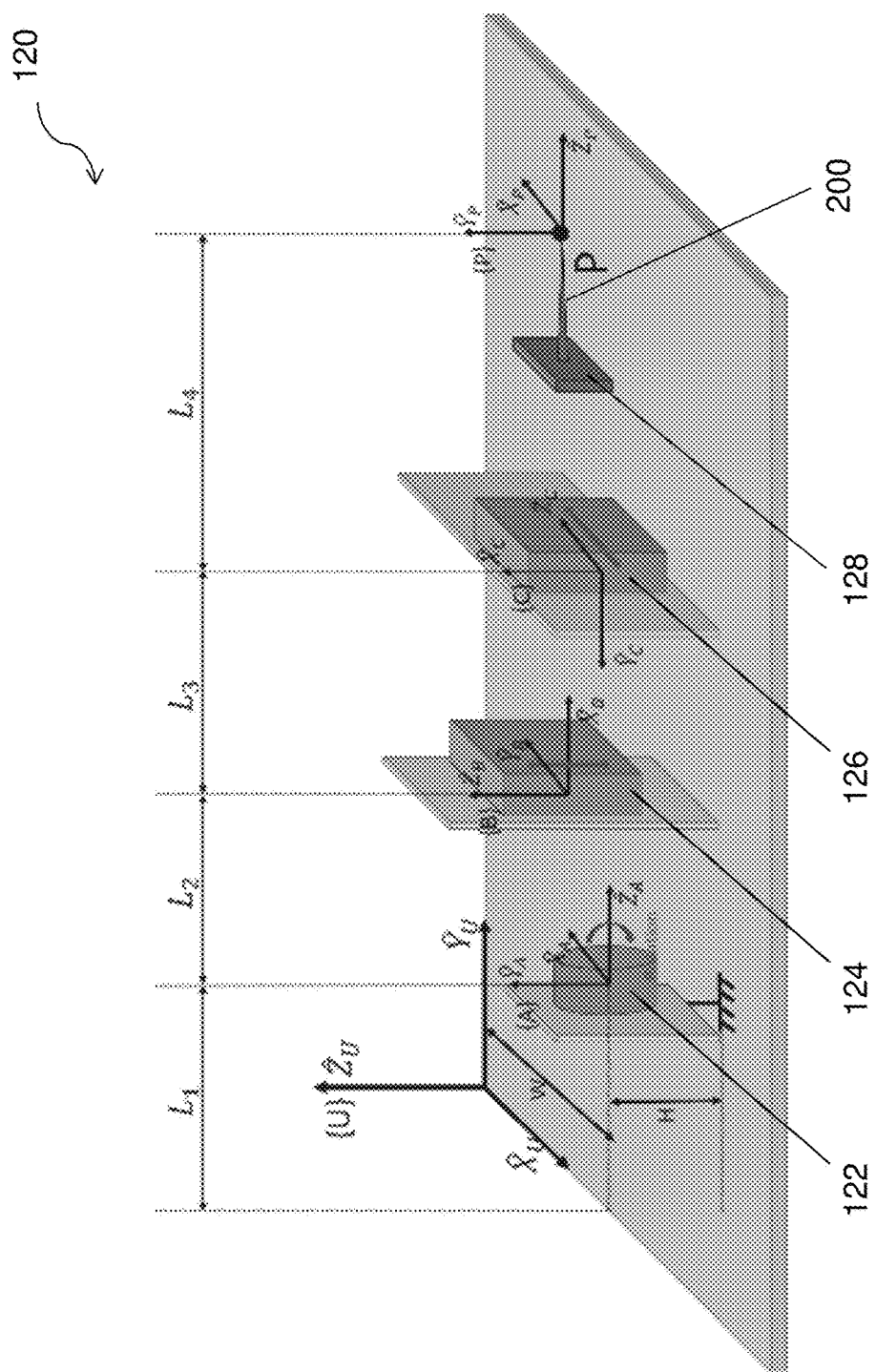
FIG. 3 is a schematic diagram showing the coordinate system of the manipulator in FIG. 2.

With reference to FIGS. 2 to 3, the manipulator 120, for example, a nanorobot system 120 may comprises three independent nanopositioners: a rotary positioner 122 for providing a first rotational movement, and two linear positioners 124, 126 for providing at least two second translational movements. Preferably, the first rotational movement and the second translation movements are within the same plane or two parallel planes. Preferably, the directions of the two second translational movements are perpendicular to each other.

In this embodiment, the first linear positioner 124 may be mounted on the rotary positioner 122, and the second linear positioner 126 may be mounted on the first linear positioner 124 respectively. The movement directions of the two linear positioners 124 and 126 are mutually perpendicular. Thus, the manipulator 120 may have three degrees of freedom (DOFs) in total, i.e., two mutually perpendicular translational DOFs along the X, Y axis and one rotary DOF. Optionally, it would be understood by the person skilled in the art that a third positioner (not shown) with a translational DOF along the Z-axis may be provided to ensure that the sample 200 is positioned within the frame of the microscope 130.

Preferably, a sample holding stage 128 may be mounted on the second linear positioner 126, such that the positioning of the sample 200 may be moved by a first rotational movement for multi-direction observation, and further adjusted by a plurality of second translational movement manipulated by a micromanipulation mechanism 60.

Advantageously, the three nanopositioners 122, 124 and 126 may be controlled via input pulse frequency independently, thereby positioning the sample 200 with high degree of precision along the X, Y and Z axis.

Preferably, the travel range, resolution, repeatability, maximum drive velocity and maximum load of the rotary positioner 122 may be 360° endless, µ°, 5% over full range, 10°/s and 20N. Preferably, the travel range, resolution, repeatability, maximum drive velocity and maximum load of the linear positioners 124, 126 may be 20 mm, 1 nm, 50 nm, 4.5 mm/s and 90N respectively. Preferably, the nanopositioners may be ECS3030 manufactured by Attocube Inc.

Alternatively, the rotary positioner 122 and two linear positioners 124, 126 may be arranged in other sequences. It would be also understood by person skilled in the art that the manipulator 120 may comprises multiple stacking linear positioners for providing movement directions in X, Y and Z axis or movement in any other directions.

Preferably, the movement control of the three positioners 122, 124 and 126 of the manipulator 120 may be implemented by integration of Microsoft Visual Studio and the dynamic-link library of the manipulator 120.

Figure 4:
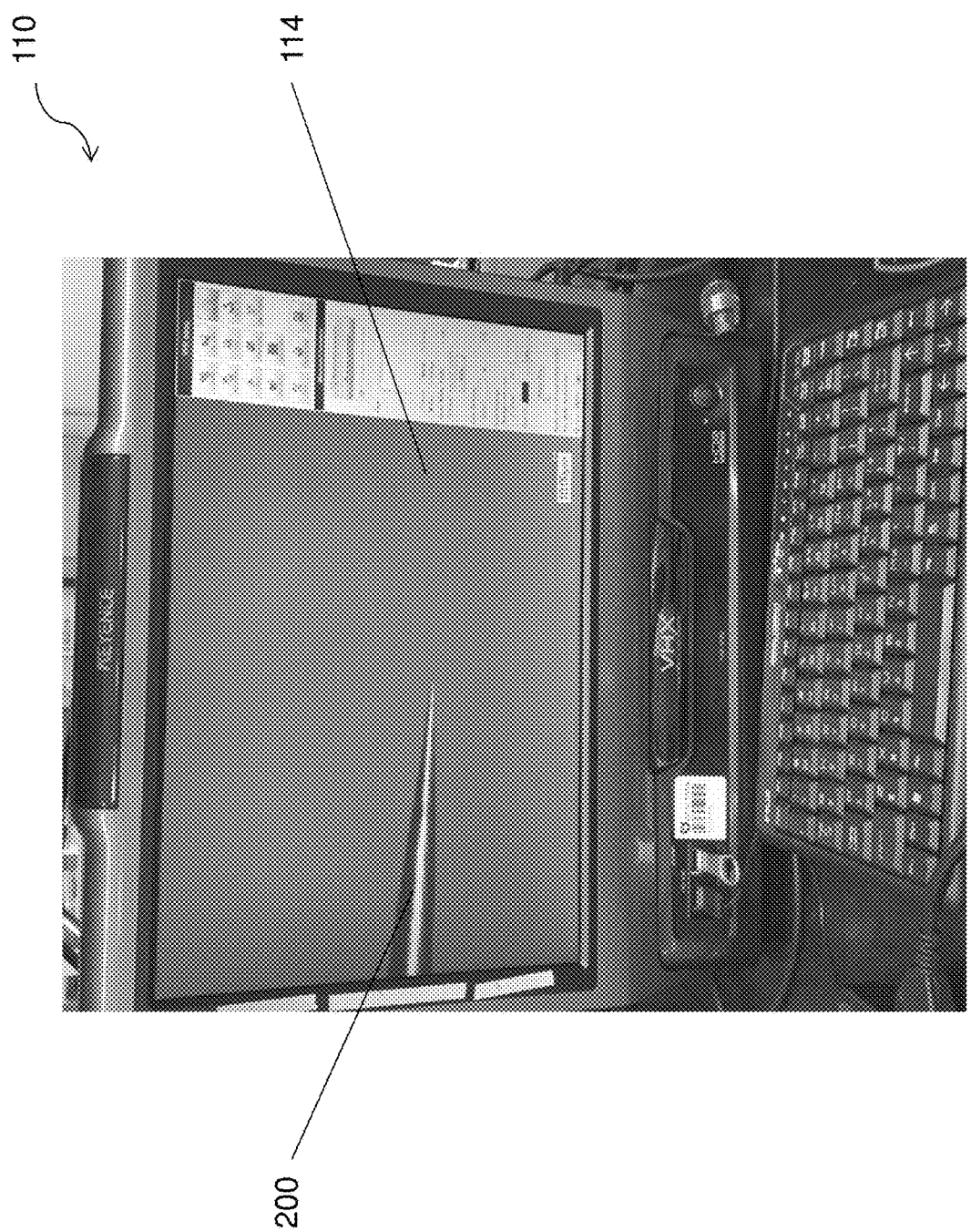
FIG. 4 is an illustration showing the controller of system in FIG. 1.

With reference to FIG. 4, the controller 110, for example, a video-microscope system 110 may be provided as a primary source of feedback during multi-direction observation. The controller 110 may comprises an optical imager e.g. a camera 112 and a monitor 114 for determining the intermediate position P of the sample 200. Preferably, the camera 112 may be an add-on microscopy means to the microscope 130 or incorporated as part of the microscope 130 for observing and capturing the top view of the sample 200. Preferably, the monitor 114 may be a LCD monitor for displaying the captured top view of the sample 200 by the camera 112. Preferably, the controller 110 may be modified based on a KEYENCE Digital Microscope VHX-1000e.

In this embodiment, the main technical specifications of the camera 112 and the LCD monitor 114 are shown in Table I and Table II. Advantageously, this video-microscope system 110 is able to meet the demands of calibration and multi-direction observation via dynamic regulation 60 as devised by the inventors.

TABLE I

TECHNICAL SPECIFICATIONS OF THE CAMERA

| Parameter | Value | Parameter | Value |
| --- | --- | --- | --- |
| Image capture device | 1/1.8-inch, 2.11 million-pixel CCD image sensor | High dynamic range | 16-bit resolution through RGB data from each pixel |
| Scan method | Progressive | Gain | Auto, normal, reset |

TABLE I-continued

TECHNICAL SPECIFICATIONS OF THE CAMERA

| Parameter | Value | Parameter | Value |
| --- | --- | --- | --- |
| Resolution | 1600 * 1200 | Supercharge shutter | 0.2 sec. to 17 sec. |

TABLE II

TECHNICAL SPECIFICATIONS OF THE LCD MONITOR

| Parameter | Value | Parameter | Value |
| --- | --- | --- | --- |
| Size | Color CCD (TFT) 17" | Panel size | 365.76(H) * 228.60(V)mm |
| Pixel pitch | 0.1905(H) * 0.1905(V)mm | Number of pixels | 1920(H) * 1200(V) |
| Display color | Approx 16,770,000 colors | Viewing angle | ±80° (typ., horizontal) ±70° (typ., vertical) |
| Brightness | 270 cd/m² (typ.) | Contrast ratio | 450:1 (typ) |

Referring to FIG. 3 again, multiple coordinates and parameters are defined to derive the relationship between the components of the manipulator 120. The world coordinate {U} is defined for the stage 128. The coordinates {A}, {B} and {C} are defined for the three nanopositioners 122, 124 and 126. The coordinate {P} is defined for the sample 200. $L_1$, W and H represent the X, Y, Z axis coordinate values of coordinate {A} relative to coordinate {U}. $L_2$, $L_3$ and $L_4$ represent the distance between {A} and {B}, {B} and {C}, {C} and {P} respectively.

Without wishing to be bound by theory, the inventors, through their own research via trials and experimentations, have discovered that due to assembly errors of the components e.g. the tolerance of the parts, human errors etc., the sample 200 is not exactly located in the same coordinate frame with the world coordinate {U}. Taking the high magnification power of the microscope 130 and the small scale of the sample 200 into account, it would be understood by person skilled in the art that even a small assembly error can lead to significant problems in setting up the microscope 130.

Figure 5:
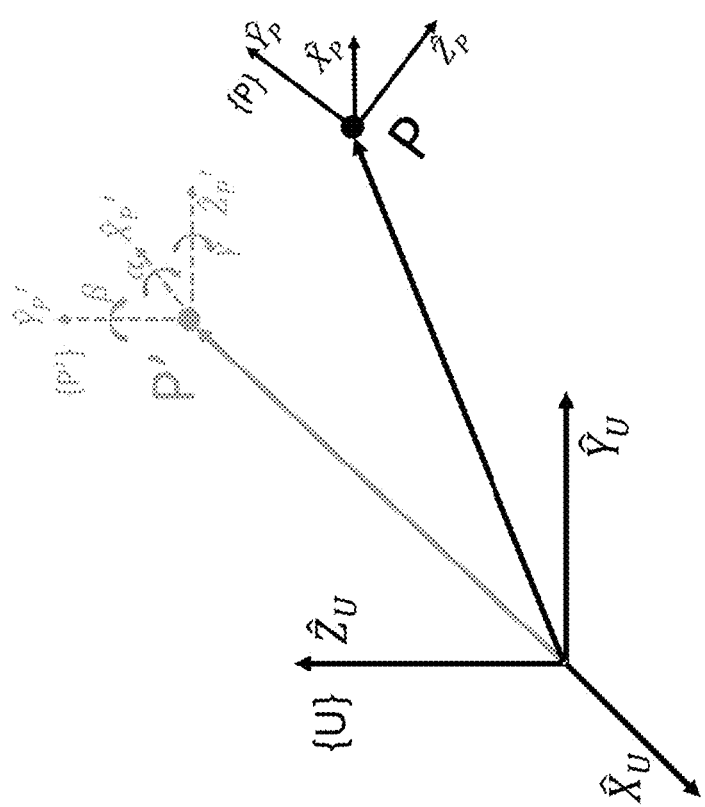
FIG. 5 is a schematic diagram showing the assembly errors of the sample.
Figure 6:
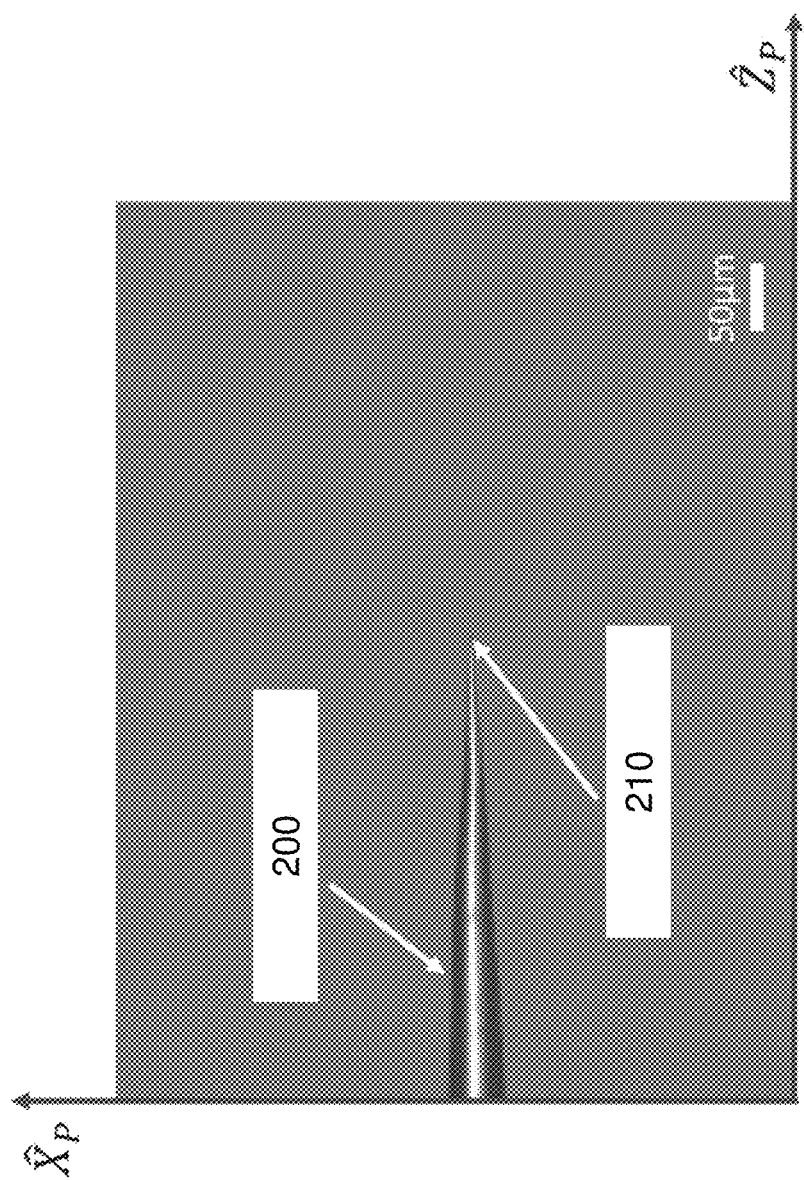
FIG. 6 is an illustration showing the microscope image of a tungsten tube obtained by the controller in FIG. 4.

With reference to FIG. 5, the optimal coordinate system P' determined from the three dimensional arrangement of the sample 200 and the actual intermediate coordinate system P of the sample 200 are not aligned or coincided. This means the error of the first rotational movement by the rotational positioner 122 is associated with the offset of the intermediate position P from the optimal position P'. This assembly error may cause the operation failures of the microscopy 130, such that the sample 200 may not be multi-direction observed during the experiment. To mitigate or reduce at least some of the assembly error, the inventors have devised a kinematic analysis to calibrate the errors between the two sets of the coordinates P and P', thereby compensating the error of the first rotational movement by the second translational movement with the control mechanism of the micromanipulation mechanism 60.

Preferably, the rotation matrix may be represented by:—

$$_P^{P'}R_{XYZ} = R_{Z(\gamma)}R_{Y(\beta)}R_{X(\alpha)} = \begin{bmatrix} c\gamma c\beta & c\gamma s\beta s\alpha - s\gamma c\alpha & c\gamma s\beta c\alpha + s\gamma s\alpha \\ s\gamma c\beta & s\gamma s\beta s\alpha + c\gamma c\alpha & s\gamma s\beta c\alpha - c\gamma s\alpha \\ -s\beta & c\beta s\alpha & c\beta c\alpha \end{bmatrix}$$

where $s\alpha$, $s\beta$, $s\gamma$, $c\alpha$, $c\beta$ and $c\gamma$ represent $\sin \alpha$, $\sin \beta$, $\sin \gamma$, $\cos \alpha$, $\cos \beta$ and $\cos \gamma$ respectively.

The optimal coordinate system P' and the intermediate coordinate system P of the sample 200 may be defined as $P'=[P_x{'}\ P_y{'}\ P_z{'}]^T$ and $P=[P_x\ P_y\ P_z]^T$ relative to the base coordinate system ○. The relationship between P' and P is represented as follows:—

$$P = {}_P^{P'}R_{XYZ}^{-1} \cdot P'$$

$$\begin{bmatrix} P_x \\ P_y \\ P_z \end{bmatrix} = \begin{bmatrix} c\gamma c\beta & s\gamma c\beta & -s\beta \\ c\gamma s\beta s\alpha - s\gamma c\alpha & s\gamma s\beta s\alpha + c\gamma c\alpha & c\beta s\alpha \\ c\gamma s\beta c\alpha + s\gamma s\alpha & s\gamma s\beta c\alpha - c\gamma s\alpha & c\beta c\alpha \end{bmatrix} \cdot \begin{bmatrix} P'_x \\ P'_y \\ P'_z \end{bmatrix}$$

In one embodiment, there may be n intermediate positions $[P_{xi}\ P_{yi}\ P_{zi}]^T$ and corresponding optimal positions $[P_{xi}{'}\ P_{yi}{'}\ P_{zi}{'}]^T$, =1, 2, ... n for a sample 200 rotated at multiple angles. The intermediate position P data may be obtained from microscopy 130 and the corresponding optimal position P' data may be derived via following equations:—

$$P_x' = W - d_1 * \sin\theta + d_2 * \cos\theta$$

$$P_y' = L_1 + L_2 + L_3 + L_4$$

$$P_z' = H + d_1 * \cos\theta + d_2 * \sin\theta$$

where $d_1$ and $d_2$ represent the translational movement of every prismatic joint which is variable values.

$$_P^{P'}R_{XYZ} = \begin{bmatrix} 1 & 0 & 0 \\ 0 & 1 & 0 \\ 0 & 0 & 1 \end{bmatrix}$$

Through calculating the matrix, the inventors may obtain $\alpha$, $\beta$ and $\gamma$ from experiments and thereby adjust the assembly such that $\alpha$, $\beta$ and $\gamma$ are infinitely close to 0 degree by solving the following equation:—

$$\text{Let } [P_1\ P_2\ ...\ P_n] = \begin{bmatrix} {}_P^{P'}R_{XYZ}^{-1}P'_1 & {}_P^{P'}R_{XYZ}^{-1}P'_2 & ... & {}_P^{P'}R_{XYZ}^{-1}P'_n \end{bmatrix}$$

The inventors have devised that the product of all four link transformation matrix may be described according to the Denavit-Hartenberg parameters, which is represented by:—

$$_P^U T = {}_A^U T {}_B^A T {}_C^B T {}_P^C T = \begin{bmatrix} 0 & -\sin\theta & -\cos\theta & P'_x \\ -1 & 0 & 0 & P'_y \\ 0 & \cos\theta & -\sin\theta & P'_z \\ 0 & 0 & 0 & 1 \end{bmatrix}$$

In one example, the microscope 130 may observe a sample 200 e.g. a tungsten tube 200 with a tip 210 being taken as the to-be-aligned point under a desired magnification. Preferably, the top view of the tungsten tube 200 may be captured by microscopy via the camera 112.

Figure 7:
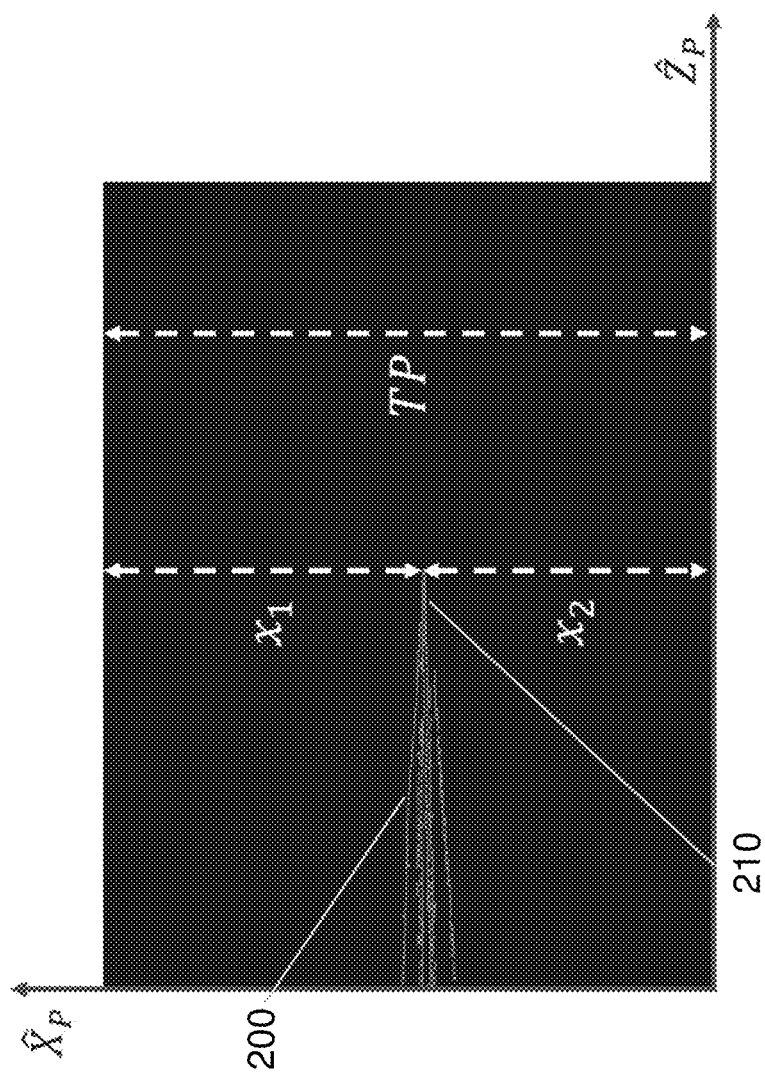
FIG. 7 is an illustration showing the object detection result based on the image obtained in FIG. 6 using Canny edge detection algorithm.

With reference to FIG. 7, the geometry of the sample 200 in the X-axis may be obtained from the image captured by the camera 112 through image processing, for example, this may be achieved by determining the positions of the sample 200 with an edge detector such as the feature extraction by the Canny operator. The X coordinate of the tip 210 may be derived in the form of sample coordinate system {P} by:—

$$x_{tip} = \frac{TP - x_1 - x_2}{2} + x_2$$

where TP is the height of the full screen, $x_1$ is the distance between tip 210's upper edge and image's upper edge, $x_2$ is the distance between tip 210's bottom edge and image's bottom edge respectively.

Preferably, the image processing to calculate sample's coordinate may be implemented with OpenCV library, which has been integrated into the software of Microsoft Visual Studio during experiments.

As aforementioned, the sample 200 may be moved out of FOV of the microscope 130 during the multiple angle rotation. As such, the inventors have devised a dynamic regulation strategy 60 to monitor the position of the sample 200 within an optimal position P', thereby facilitating the multi-direction observation.

Figure 8:
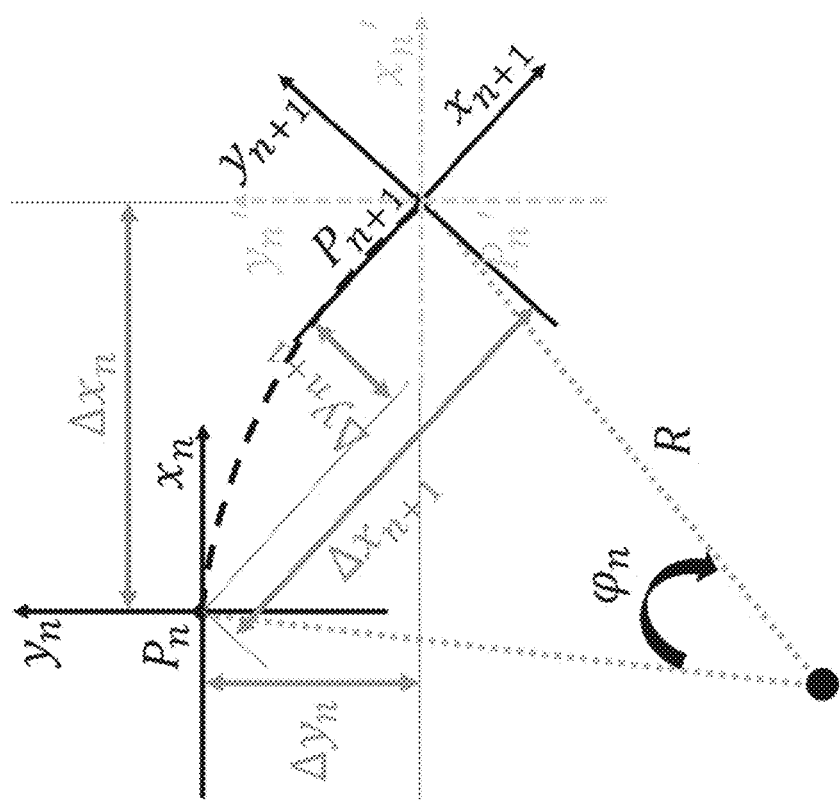
FIG. 8 is a schematic diagram showing the simplified movement model of the sample under rotation.

With reference to FIG. 8, $P_n = [P_{x_n}\ P_{y_n}\ P_{z_n}]^T$ is defined as the initial position of the sample 200, $P_{n+1} = [P_{x_{n+1}}\ P_{y_{n+1}}\ P_{z_{n+1}}]^T$ is defined as the position of the sample 200 after rotating $\varphi_n$ degree, and $P_{n'}$ is the auxiliary optimal position for calculating the coordinate system relationship between $P_n$ and $P_{n+1}$.

In this embodiment, $\Delta x_n$ and $\Delta y_n$ represent X-axis and Y-axis distance between $P_n$ and $P_{n+1}$ respectively. $\Delta x_{n+1}$ and $\Delta y_{n+1}$ represent the move distance of two linear positioners 124, 126 respectively. Preferably, $\Delta x$ can be derived through imaging processing, and $\Delta y_n$, $\Delta x_{n+1}$ and $\Delta y_{n+1}$ may be derived from geometry with the following equations:—

$$\Delta y_n = \sqrt{\left(2 * R * \sin\left(\frac{\varphi_n}{2}\right)\right)^2 - (\Delta x_n)^2}$$

$$\Delta x_{n+1} = \Delta y_n * \sin(\varphi_n) + \Delta x_n * \cos(\varphi_n)$$

$$\Delta y_{n+1} = -\Delta y_n * \cos(\varphi_n) + \Delta x_n * \sin(\varphi_n)$$

where R represents the rotation radius of the sample 200

The inventors have devised that the unknown value of R may be further derived from the following equations:—

$$\Delta x_f = R * \cos(\delta_3 - \delta_1) - R * \cos * (\delta_3)$$

$$\Delta x_b = R * \cos(\delta_2 + \delta_3) - R * \cos * (\delta_3)$$

$$\Delta x_f = R * [\cos(\delta_1) - 1] * \cos(\delta_3) + R * \sin(\delta_1) * \sin(\delta_3)$$

$$\Delta x_b = R * [\cos(\delta_2) - 1] * \cos(\delta_3) - R * \sin(\delta_2) * \sin(\delta_3)$$

$$\begin{bmatrix} \Delta x_f \\ \Delta x_b \end{bmatrix} = R * \begin{bmatrix} \cos(\delta_1) - 1 & \sin(\delta_1) \\ \cos(\delta_2) - 1 & -\sin(\delta_2) \end{bmatrix} * \begin{bmatrix} \cos(\delta_3) \\ \sin(\delta_3) \end{bmatrix}$$

$$R^2 = \begin{bmatrix} \Delta x_f \\ \Delta x_b \end{bmatrix}^T * \left( \begin{bmatrix} \cos(\delta_1) - 1 & \sin(\delta_1) \\ \cos(\delta_2) - 1 & -\sin(\delta_2) \end{bmatrix}^{-1} \right)^T *$$

$$R = \frac{\begin{bmatrix} \cos(\delta_1)-1 & \sin(\delta_1) \\ \cos(\delta_2)-1 & -\sin(\delta_2) \end{bmatrix}^{-1} * \begin{bmatrix} \Delta x_f \\ \Delta x_b \end{bmatrix}}{\left(\frac{\Delta x_f * \Delta x_b - (\Delta x_b)^2 - (\Delta x_f)^2 + (\Delta x_b)^2 * \cos(\delta_1) + (\Delta x_f)^2 * \cos(\delta_2) - }{\Delta x_f * \Delta x_b * \cos(\delta_1) - \Delta x_f * \Delta x_b * \cos(\delta_2) + \Delta x_f * \Delta x_b * \cos(\delta_1 + \delta_2)}\right)^{\frac{1}{2}}}{(\cos(\delta_1)-1)*(\cos(\delta_2)-1)*(\cos(\delta_1+\delta_2)-1)}$$

Figure 9:
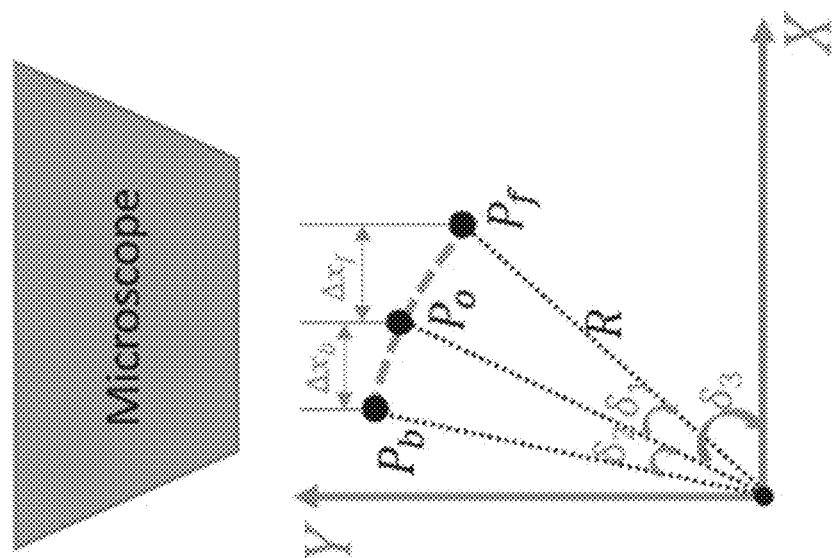
FIG. 9 is a schematic diagram showing the position of the sample on the x-y plane with the sample rotated in clockwise and anticlockwise direction.

With reference to FIG. 9, the sample 200 may be rotated in clockwise and anticlockwise directions respectively. $P_o$ is sample's initial position, $P_f$ is sample's position after rotates $\delta_1$ degrees clockwise, and $P_b$ is sample's position after rotates $\delta_2$ degrees anticlockwise. $\delta_3$ is the angle between $P_o$ and X-axis. $\Delta x_f$ is the difference of $P_f$ and $P_o$'s x-coordinates, and $\Delta x_b$ is the difference of $P_b$ and $P_o$'s x-coordinates respectively.

The inventors have discovered that there may be some errors in the process of the experiment. For instance, these errors may be contributed by motor rotation, mechanical assembly, image processing and the external environment disturbance. Advantageously, the experiment is conducted with a high precision assembly system having a repeatability resolution of the rotation motor of 1 m° under a highly stable environment, such that all the errors associated with motor rotation, mechanical assembly and the external environment disturbance may be ignored.

In this embodiment, the main error in the process of the experiment is contributed by image processing. Therefore, the actual x coordinate difference $\Delta x_f'$ between point $P_0$ and $P_f$, and the actual y coordinate difference $\Delta x_b'$ between point $P_0$ and $P_b$ on the x-y plane system may be represented by:—

$$\Delta x_f = \Delta x_f' + \Delta err_1 = R*\cos(\delta_3-\delta_1) - R*\cos(\delta_3)$$

$$\Delta x_b = \Delta x_b' + \Delta err_2 = R*\cos(\delta_2+\delta_3) - R*\cos(\delta_3)$$

$$(R')^2 = \begin{bmatrix} \Delta x_f' \\ \Delta x_b' \end{bmatrix}^T * \left(\begin{bmatrix} \cos(\delta_1)-1 & \sin(\delta_1) \\ \cos(\delta_2)-1 & -\sin(\delta_2) \end{bmatrix}^{-1}\right)^T *$$

$$\begin{bmatrix} \cos(\delta_1)-1 & \sin(\delta_1) \\ \cos(\delta_2)-1 & -\sin(\delta_2) \end{bmatrix}^{-1} * \begin{bmatrix} \Delta x_f - \Delta err_1 \\ \Delta x_b - \Delta err_2 \end{bmatrix}$$

while $\Delta err_1$ and $\Delta err_2$ represent the image processing error of $\Delta x_f$ and $\Delta x_b$ respectively As the same image processing strategy is used during the process of the whole experiment, it may be assumed that the errors of the distances between the samples 200 at different position to be the same:—

$$\Delta err_1 = \Delta err_2 = \Delta err$$

By calculating all the equations above, the minimum error may be obtained only if $\delta_1=\delta_2=90°$. Therefore, in order to figure out the most accurate value of R, different magnification times with the same $\delta_1$ and $\delta_2$ are selected to compute the average value of R during the experiment.

Figure 10:
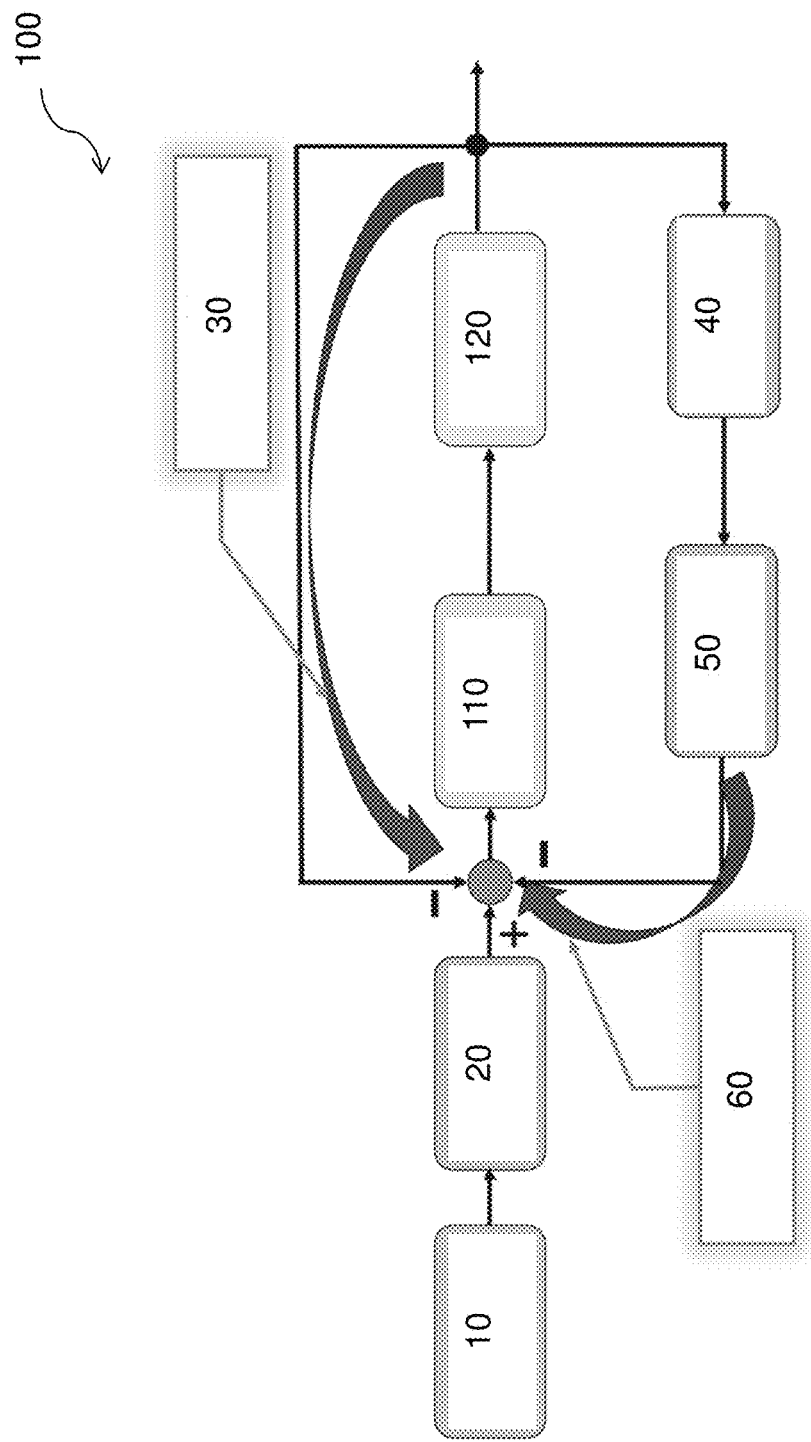
FIG. 10 is a schematic diagram showing the control mechanism of the system in FIG. 1.

With reference to FIG. 10, the controller 110 may be implemented as part of the system 100 with the following control strategy. Firstly, a rough adjustment 10 may be adopted by the system 100 to ensure that the sample 200 is approximately located in the centre of rotary positioner 122 and the distance between sample 200 and rotation centre R is calculated simultaneously. Secondly, a trajectory generator 20 provides the referential rotation angles to the controller 110. Thirdly, the controller 110 commands the manipulator 120 to achieve the established position.

Preferably, the upper position feedback loop 30 associated with the controller 110 and the manipulator 120 may calculate the position information of the sample 200, while the lower dynamic regulation loop 60 associated with the image processing 40 and the inverse kinematic 50 may maintain the sample 200 at the sample optimal position P' during the rotation.

Without wishing to be bound by theory, the inventors, through their own research via trials and experimentations, have derived a method for use in optical imaging, comprising the steps of: determining an intermediate position P of a sample 200 upon a detection of a completion of a first movement of the sample 200; deriving an optimal position P' associated with the intermediate position P, wherein the sample 200 is arranged to be observed using an optical instrument 130 in the optimal position P'; and moving the sample 200 from the intermediate position P to the optimal position P' with a second movement.

Figure 11:
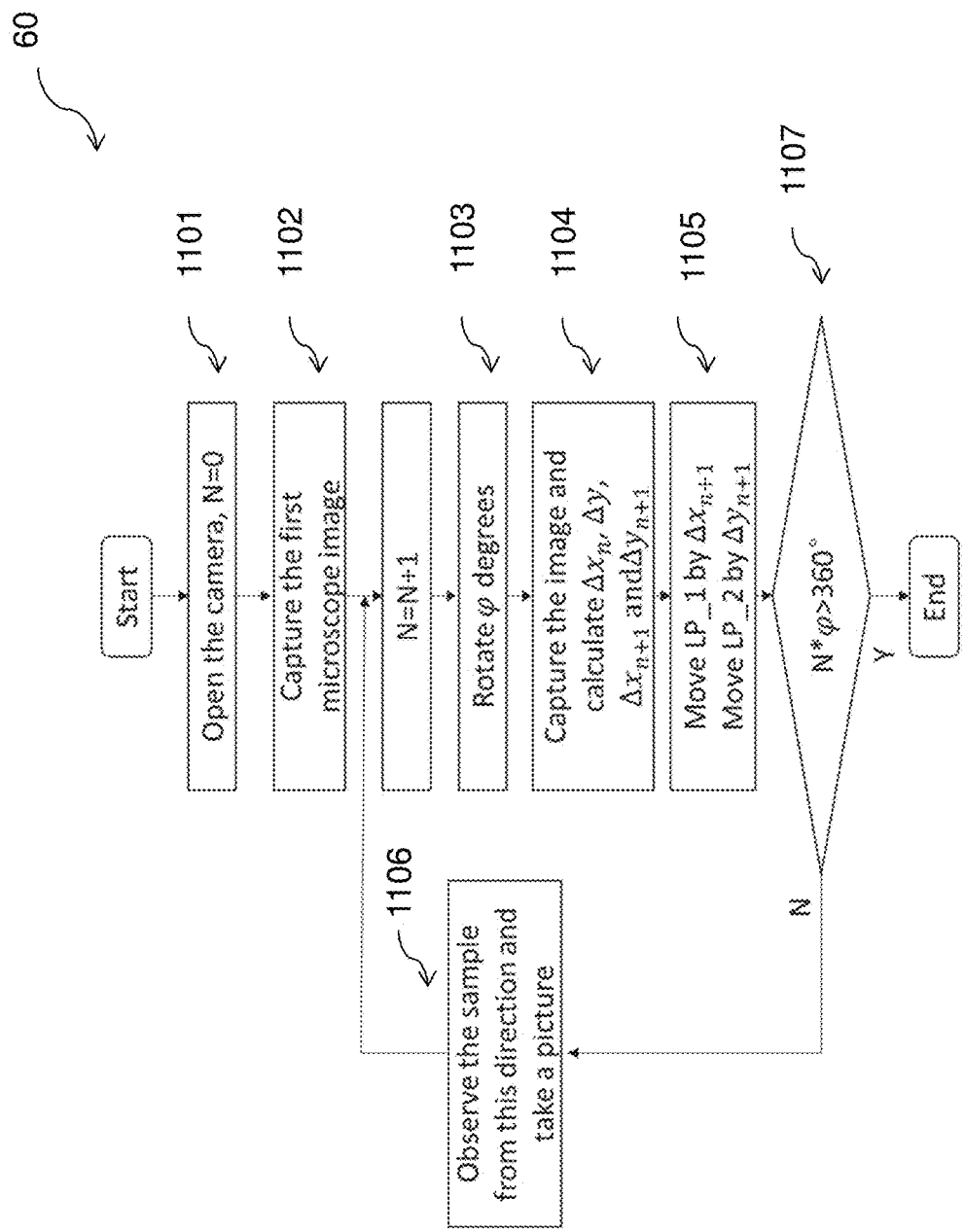
FIG. 11 is a schematic diagram showing the entire process of the system in FIG. 1.

With reference to FIG. 11, the control strategy of dynamic regulation 60 may be configured with the following algorithm. The sample 200 is positioned at an initial position $P_0$ prior of the first movement, with the initial position $P_0$ being arranged to be within the field of view and the depth of field of the optical instrument 130. The distance between sample 200 and the centre of the rotary motor may be calculated.

The camera 112 is first switched on in step 1101 for capturing the first microscope image of sample 200 as the evaluation criterion in step 1102. The rotary positioner 126 is rotated in clockwise and/or anticlockwise direction by a small angle of φ° in step 1103. For example, the sample 200 may be rotated at an angle of 1° about a rotation axis during the first rotational movement in this algorithm. Advantageously, φ may be defined by the user and the smaller φ is adopted, the more accurate the experiment results will be.

The initial position $P_0$ of the sample 200 is obtained by the camera 112 in step 1102, and the intermediate position P of the sample 200 is obtained by the camera 112 in step 1104 through image processing. Based on these obtained parameters, the first movement of the sample 200 is detected and $\Delta x_n$, $\Delta y_n$, $\Delta x_{n+1}$ and $\Delta y_{n+1}$ are calculated with the aforementioned equations in step 1104.

The linear positioners 126 and 124 would be moved by the calculated $\Delta x_{n+1}$ and $\Delta y_{n+1}$ respectively in step 1105 in a second translational movement, such that the sample 200 is now positioned in the optimal position P'. The top view of the sample 200 is then captured by the camera 112.

By completing step 1105, the sample 200 would be fixed at the same position as the initial position $P_0$ of the sample 200 obtained from the first microscope image in step 1102. Preferably, the method is repeated to observe the sample 200 in a plurality of optimal positions P' with respect to a plurality of rotational angles based on the initial position $P_0$ in step 1107, thereby rotating the sample for a complete revolution with the sample holding stage 128. This allow the sample 200 to be observed under the optical instrument 130 in the optimal position P' at every rotated angle about the rotation axis.

Preferably, the value of R may be calculated to evaluate the performance of the system 100. Advantageously, the experiments may be repeated under various magnifications to obtain an accurate value. Optionally, the experiment may be performed with the magnifications of 500 times, 600 times, 700 times, 800 times, 900 times and 1000 times and the results are shown in Table III.

TABLE IIII

| CALCULATION OF R | |
| --- | --- |
| Magnification times | Value of R (μm) |
| 500 | 29.2968 |
| 600 | 29.0074 |
| 700 | 31.1931 |
| 800 | 29.9818 |
| 900 | 30.9419 |
| 1000 | 27.5863 |

The inventor have devised that the value of R may be represented as follow:—

$$R = \frac{\sum_{i=1}^{n} R_i - R_{max} - R_{min}}{n-2}$$

For example, the value of R obtained in this example is 29.8069 μm.

Figure 12:
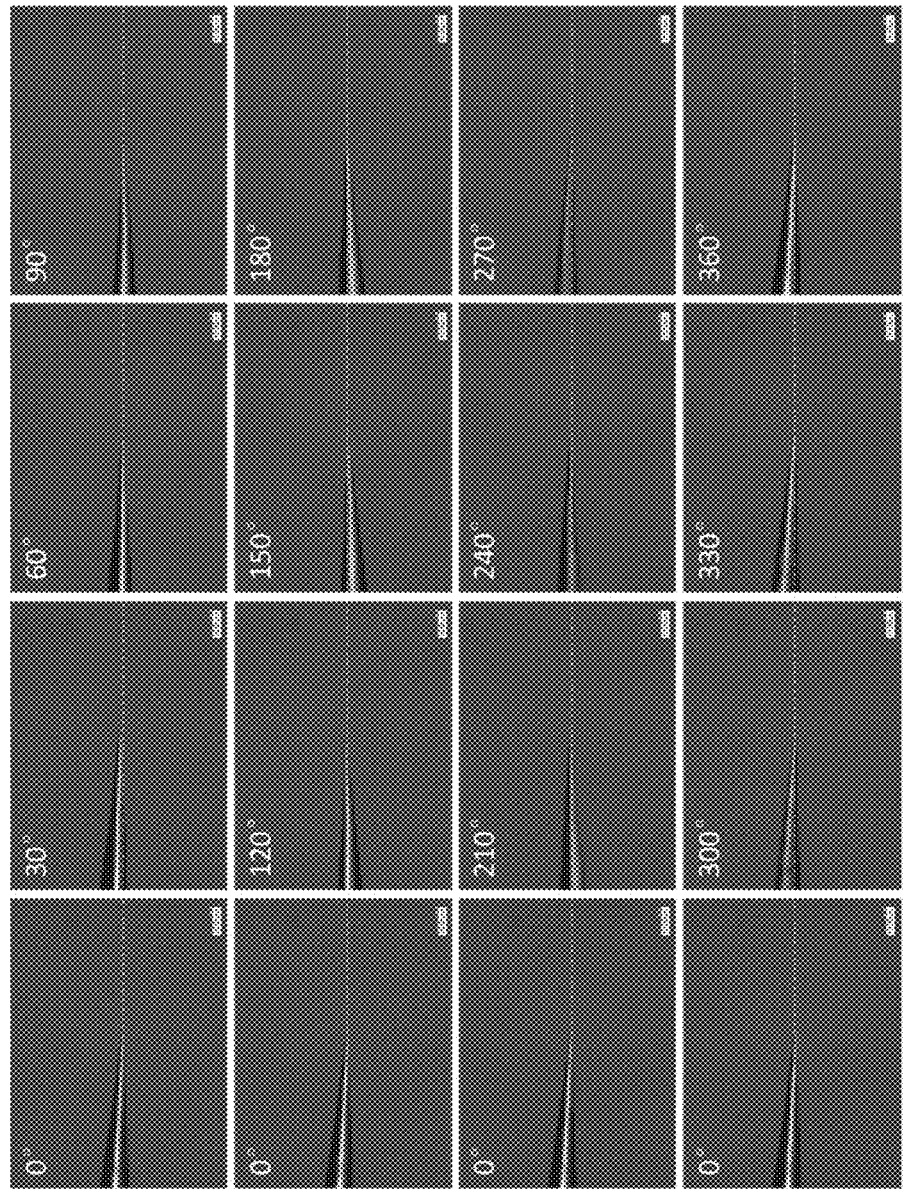
FIG. 12 is an illustration showing a sample tungsten tube observed from different orientations under system in FIG. 1, with the aiding of the control mechanism.

With reference to FIG. 12, a tungsten tube with a tip diameter 1 μm is taken as the micro sample 200. The tip center 210 of the tungsten tube 200 is taken as the optimal position P' being observing under system 100 at various magnifications via dynamic regulation 60. In this embodiment, a magnification of 1000 times may be adopted to perform the experiments.

In one alternative embodiment, there is provided an optical system 100, comprising: a sample holding stage 128 arranged to move the sample 200 from an initial position $P_0$ to an intermediate position P with a first movement, and to move the sample 200 from the intermediate position P to an optimal position P' with a second movement; a controller 110 arranged to determine the intermediate position P upon a completion of the first movement, and to derive the optimal position P' associated with the intermediate position P; an optical instrument 130 arranged to observe the sample positioned in the initial position $P_0$ and/or the optimal position P'.

Figure 13:
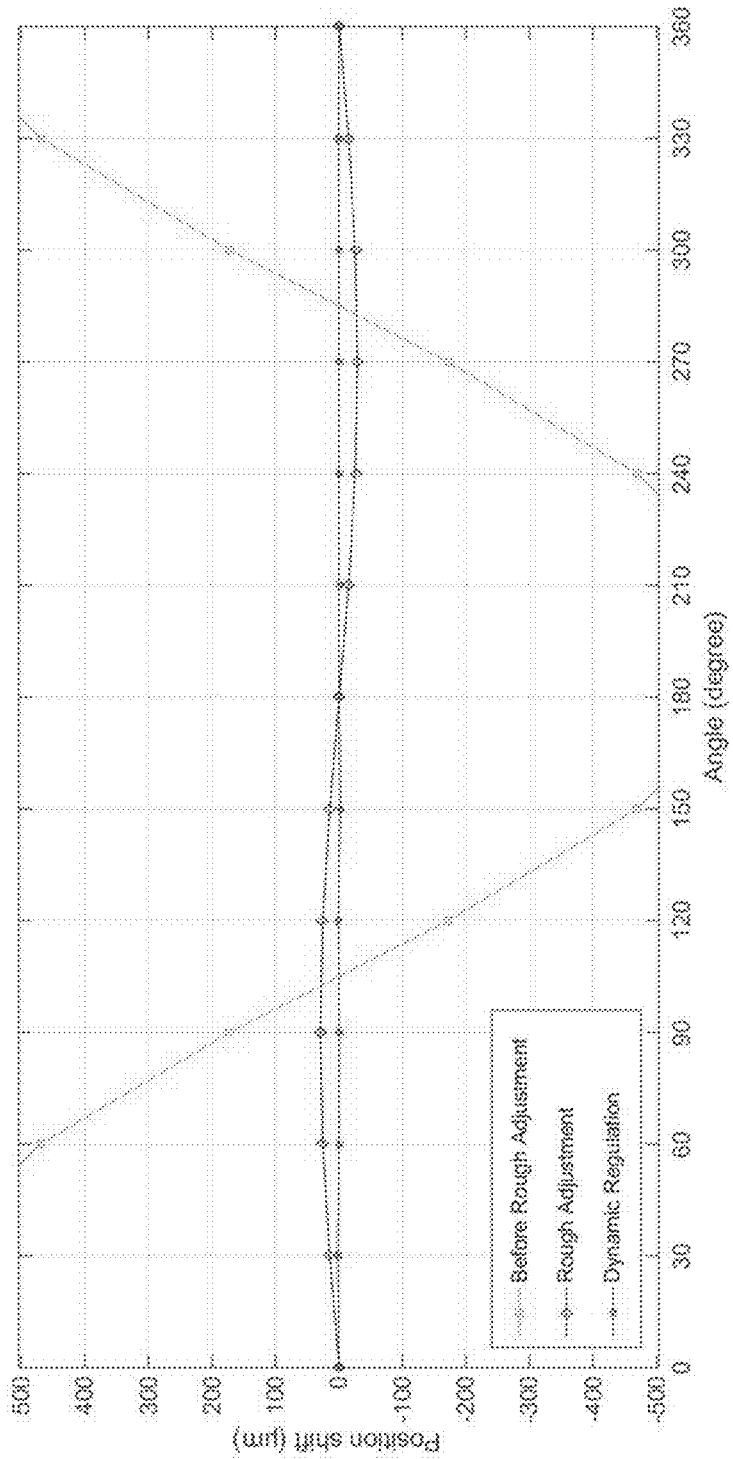
FIG. 13 is an illustration showing a sample's position at different rotation angle for different experiment.
Figure 14:
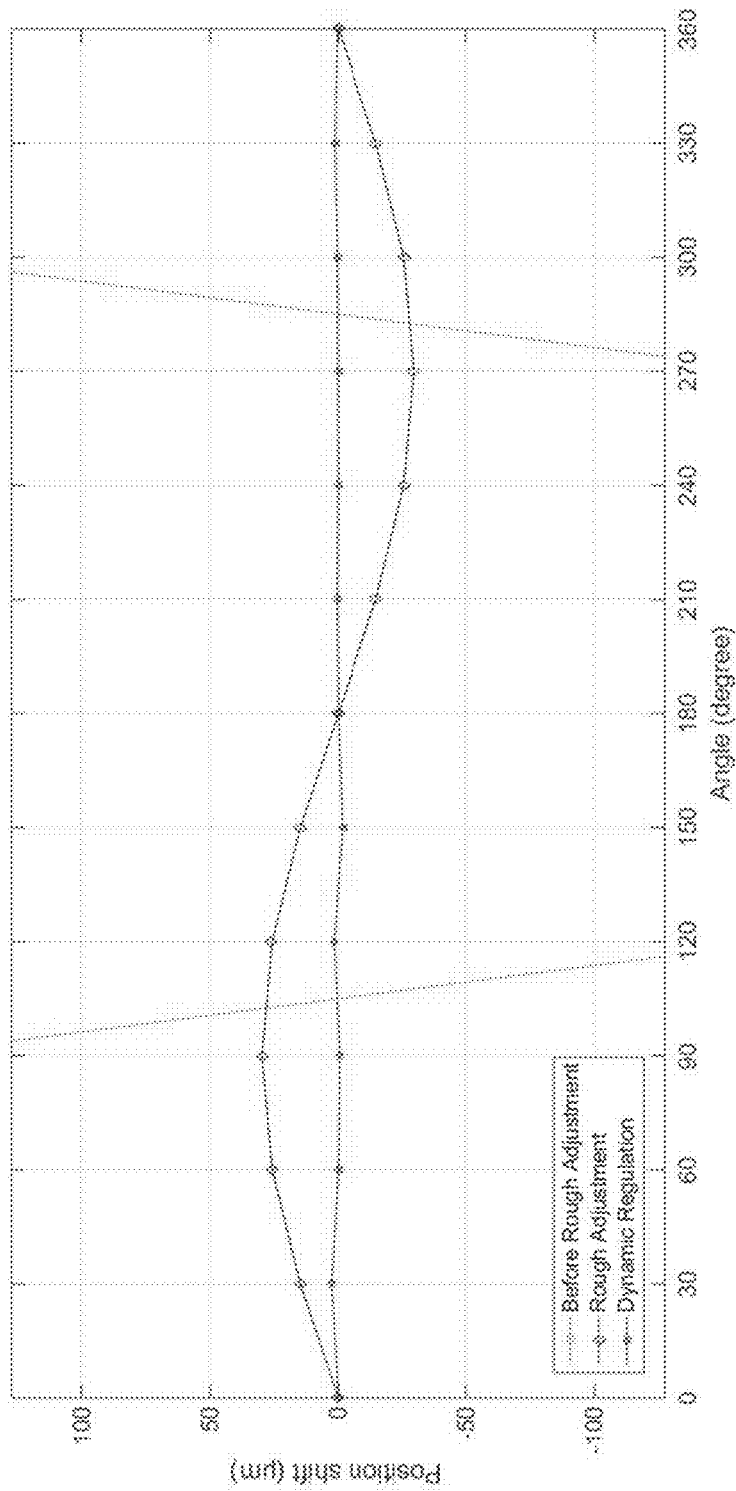
FIG. 14 is an enlarged illustration of FIG. 13 showing a sample's position at different rotation angle for different experiment.
Figure 15:
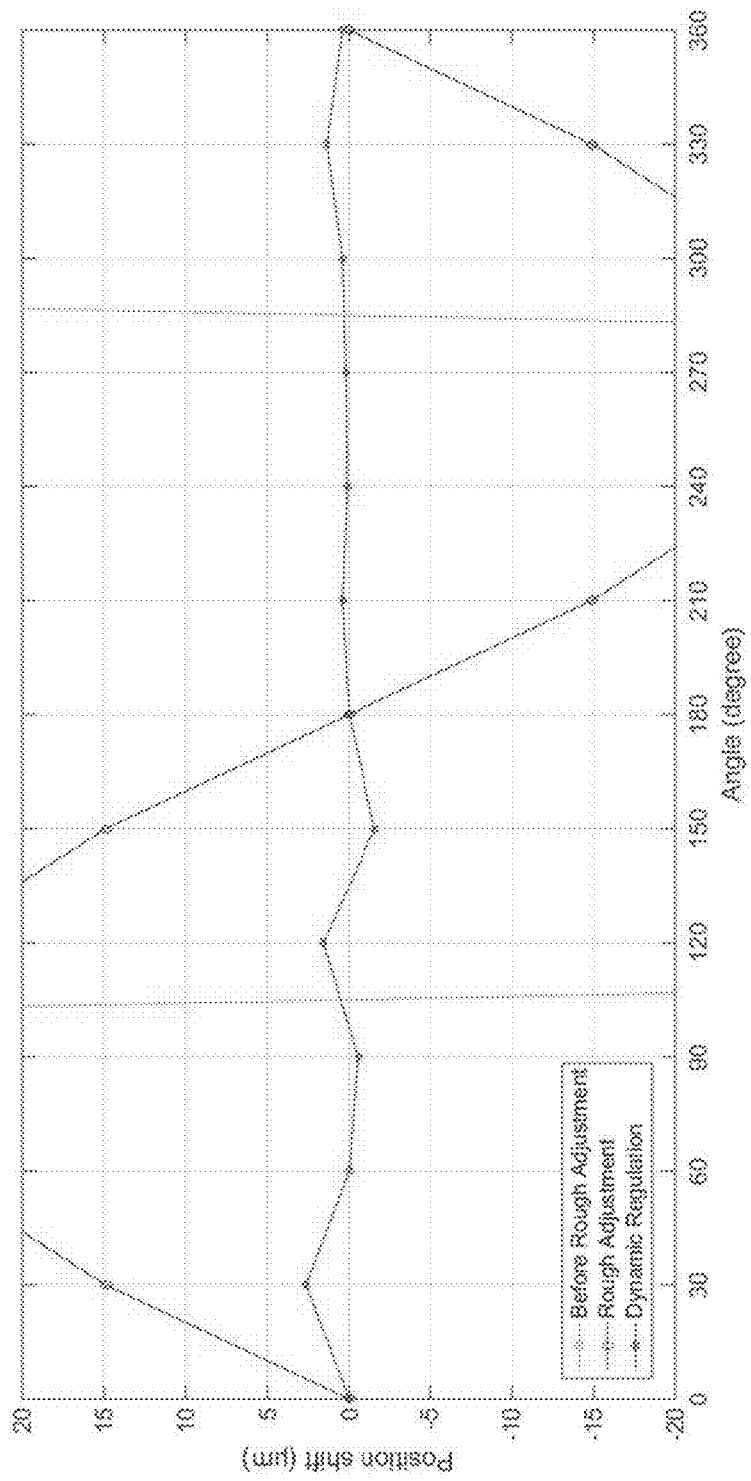
FIG. 15 is an enlarged illustration of FIG. 14 showing a sample's position at different rotation angle for different experiment.

With reference to FIGS. 13 to 15, the effectiveness of the rough adjustment 10 and dynamic regulation 60 of system 100 for addressing the position offset of the sample 200 at different rotation angle are compared, with reference to the intermediate position P without any adjustment by system 100.

Advantageously, the present invention only requires the integration of a single camera 112 into system 100 for providing full-orientation sample imaging. Therefore, the restricted microscope 130 space is not an issue to the construction of the present invention, and optics of the present invention is available for sample full-orientation.

Advantageously, the stage 128 of the present invention may rotate the sample greater than 90° in both clockwise and anticlockwise direction, such that none of the sample surfaces remains invisible. The present invention also support large degree tilting or rotating without causing the sample being moved out of microscope's field of view (FOV), which leads to a failed experiment.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for use in optical imaging, comprising steps of:
determining a rough adjustment required to maintain a sample held by a rotatory positioner at approximately a center of the rotary positioner where the sample is arranged to be observed repeatedly using an optical instrument when the rotatory positioner rotates the sample at multiple angles, wherein the sample is arranged to be observed using the optical instrument in an optimal position, and the optimal position is within both a depth of field and a field of view of the optical instrument; and
repeating steps of a dynamic regulation process for obtaining a plurality of optical images of the sample from different angles, the dynamic regulation process including:
controlling the rotatory positioner by adopting the required rough adjustment to rotate the sample with a first movement to a predetermined angle, wherein the first movement includes a rotational movement about a rotation axis;
capturing a first image of the sample upon a completion of the first movement of the sample;
determining, based on image processing of the first image, an intermediate position of the sample upon a completion of the first movement of the sample about the rotation axis, the rotation axis being orthogonal to a direction from which the sample is arranged to be observed using the optical instrument, the sample having a three dimensional position including an X-direction, a Y-direction, and a Z-direction;
determining, based on image processing of the first image, an offset distance between the intermediate position and the optimal position along the X-direction, the Y-direction, and the Z-direction of the three dimensional position of the sample, wherein the offset distance is caused by rotating the sample based on the rough adjustment;
moving the rotatory positioner thereby moving the sample from the intermediate position to the optimal position with a second movement to reduce the offset distance, wherein the second movement includes a translational movement in at least two axial directions, and wherein the second movement from the intermediate position to the optimal position is arranged to provide two degrees of freedom; and
capturing and storing a second image as one of the plurality of optical images of the sample being observed from the predetermined angle.

2. The method according to claim 1, wherein the intermediate position is beyond the field of view and/or the depth of field of the optical instrument.

3. The method according to claim 1, wherein the second movement is manipulated by a micromanipulation mechanism.

4. The method according to claim 3, wherein the micromanipulation mechanism comprises a control mechanism for compensating the error of the first movement by the second movement.

5. The method according to claim 4, wherein the error of the first movement is associated with the offset of the intermediate position from the optimal position.

6. The method according to claim 1, wherein the step of determining the intermediate position of the sample further comprises the step of obtaining the initial position and the intermediate position of the sample by an imaging device.

7. The method according to claim 6, wherein the step of determining the intermediate position of the sample further comprises the step of detecting the first movement of the sample from the initial position to the intermediate position obtained by the imaging device through image processing.

8. The method according to claim 7, wherein the image processing includes determining the positions of the sample with an edge detector.

9. The method according to claim 1, wherein the sample is positioned at an initial position prior of the first movement, with the initial position being arranged to be within the field of view and the depth of field of the optical instrument.

10. The method according to claim 1, wherein the first and second movements are within the same plane or two parallel planes.

11. The method according to claim 1, wherein the method is repeated to observe the sample in a plurality of optimal positions with respect to a plurality of rotational angles based on the initial position.

12. The method according to claim 1, wherein the method is repeated to rotate the sample for a complete revolution.

13. The method according to claim 1, wherein the optical instrument is a microscope.

14. An optical imaging system, comprising:
an optical instrument arranged to observe a sample positioned in an optimal position, wherein the optimal position is within both a depth of field and a field of view of the optical instrument;
a sample holding stage having a rotary positioner arranged to hold the sample, wherein the sample is arranged to be observed repeatedly using the optical instrument when the rotary positioner rotates the sample at multiple angles; and
a controller arranged to determine a rough adjustment required to maintain the sample at approximately a center of the rotary positioner, where the controller is further arranged to control the optical instrument and the rotary positioner based on a dynamic regulation process so as to obtain a plurality of optical images of the sample from different angles by performing a dynamic regulation process, where the dynamic regulation process includes:
controlling the rotary positioner by adopting the required rough adjustment to rotate the sample with a first movement to a predetermined angle, wherein the first movement includes a rotational movement about a rotation axis;
capturing a first image of the sample upon a completion of the first movement of the sample;
determining, based on image processing of the first image, an intermediate position of the sample upon a completion of the first movement of the sample about the rotation axis, the rotation axis being orthogonal to a direction from which the sample is arranged to be observed using the optical instrument, the sample having a three dimensional position including an X-direction, a Y-direction, and a Z-direction;
determining, based on image processing of the first image, an offset distance between the intermediate position and the optimal position along the X-direction, the Y-direction, and the Z-direction of the three dimensional position of the sample, wherein the offset distance is caused by rotating the sample based on the rough adjustment;
moving the rotatory positioner thereby moving the sample from the intermediate position to the optimal position with a second movement to reduce the offset distance, wherein the second movement includes a translational movement in at least two axial directions, and wherein the second movement from the intermediate position to the optimal position is arranged to provide two degrees of freedom; and
capturing and storing a second image as one of the plurality of optical images of the sample being observed from the predetermined angle.

15. The optical imaging system according to claim 14, wherein the intermediate position is beyond the field of view and/or the depth of field of the optical instrument.

16. The optical imaging system according to claim 14, further comprising a micromanipulation mechanism arranged to move the rotatory positioner.

17. The optical imaging system according to claim 16, wherein the micromanipulation mechanism comprises a control mechanism for compensating the error of the first movement by the second movement.

18. The optical imaging system according to claim 17, wherein the error of the first movement is associated with the offset of the intermediate position from the optimal position.

19. The optical imaging system according to claim 18, wherein the controller is arranged to detect the first movement of the sample from the initial position to the intermediate position obtained by the imaging device through image processing.

20. The optical imaging system according to claim 14, wherein the controller is further arranged to obtain the initial position and the intermediate position of the sample captured by an imaging device.

21. The optical imaging system according to claim 20, wherein the image processing includes determining the positions of the sample with an edge detector.

22. The optical imaging system according to claim 14, wherein the sample is positioned at an initial position prior of the first movement, with the initial position being arranged to be within the field of view and the depth of field of the optical instrument.

23. The optical imaging system according to claim 14, wherein the first and second movements are within the same plane or two parallel planes.

24. The optical imaging system according to claim 14, wherein the method is repeated to observe the sample in a plurality of optimal positions with respect to a plurality of rotational angles based on the initial position.

25. The optical imaging system according to claim 14, wherein the controller is arranged to control the rotatory positioner to rotate the sample for a complete revolution.

26. The optical imaging system according to claim 14, wherein the optical instrument is a microscope.

* * * * *